(12) United States Patent
Yeon et al.

(10) Patent No.: US 7,689,124 B2
(45) Date of Patent: Mar. 30, 2010

(54) TWO-DIMENSIONAL OPTICAL CDMA SYSTEM, PN CODED WAVELENGTH/TIME ENCODER AND DECODER THEREIN, AND METHOD OF ENCODING/DECODING

(75) Inventors: Young Hee Yeon, Kang-won-do (KR); Bong Kyu Kim, Taejon (KR); Sung Chan Cho, Daejeon (KR); Byoung Whi Kim, Daejeon (KR); Sang Jo Park, Cheongju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1128 days.

(21) Appl. No.: 11/172,336

(22) Filed: Jun. 30, 2005

(65) Prior Publication Data

US 2006/0156158 A1    Jul. 13, 2006

(30) Foreign Application Priority Data

Dec. 17, 2004   (KR) .................... 10-2004-0108263

(51) Int. Cl.
*H04B 10/00*   (2006.01)
(52) U.S. Cl. .............................. 398/78; 398/75; 398/77
(58) Field of Classification Search ......... 398/115–116, 398/77–78
See application file for complete search history.

(56) References Cited

U.S. PATENT DOCUMENTS

| | | | | |
|---|---|---|---|---|
| 5,760,941 A * | 6/1998 | Young et al. ................. | 398/183 |
| 5,867,290 A * | 2/1999 | Dutt et al. ...................... | 398/43 |
| 5,995,255 A * | 11/1999 | Giles ............................. | 398/34 |
| 6,236,483 B1 * | 5/2001 | Dutt et al. ..................... | 398/141 |
| 6,285,806 B1 | 9/2001 | Kersey et al. | |
| 6,292,282 B1 * | 9/2001 | Mossberg et al. ............. | 398/99 |
| 6,313,771 B1 * | 11/2001 | Munroe et al. ............... | 341/137 |
| 6,314,220 B1 * | 11/2001 | Mossberg et al. ............. | 385/37 |
| 6,614,950 B2 * | 9/2003 | Huang et al. ................... | 385/15 |
| 6,628,864 B2 * | 9/2003 | Richardson et al. ........... | 385/37 |
| 6,807,372 B1 * | 10/2004 | Lee et al. ....................... | 398/78 |

(Continued)

OTHER PUBLICATIONS

Yu, Kyoungsik et al, "Wavelength-Time Spreading Optical CDMA System Using Wavelength Multiplexers and Mirrored Fiber Delay Lines" Sep. 2000, IEEE Photonics Technology Letters, vol. 12 No. 9, pp. 1278-1280.*

(Continued)

*Primary Examiner*—Agustin Bello
(74) *Attorney, Agent, or Firm*—Blakely, Sokoloff, Taylor & Zafman LLP

(57) ABSTRACT

Disclosed herein are a CDMA optical system and encoder and decoder included therein. Time domain encoding means creates a time domain code having a sequence according to inputted data bits or a complementary code which is complementary to the time domain code. An optical modulation means selectively outputs lights, in which the lights are incident upon the optical modulation means from the outside, to two output leads, respectively, according to chip bits of the time domain code or the complementary code. A wavelength domain encoding means encodes the light outputted from a first output lead of the optical modulation means to a wavelength domain sequence (two dimensional code), transmits the wavelength code to the base station, encodes the light outputted from a second output lead to a complementary sequence of the wavelength domain sequence, and transmits the complementary code of the two dimensional code to the base station.

33 Claims, 7 Drawing Sheets

U.S. PATENT DOCUMENTS

| | | | |
|---|---|---|---|
| 7,065,298 B1 * | 6/2006 | Munroe et al. | 398/77 |
| 7,068,881 B2 * | 6/2006 | Yoo | 385/31 |
| 7,174,103 B2 * | 2/2007 | Nishiki et al. | 398/77 |
| 7,200,342 B2 * | 4/2007 | Dafesh | 398/182 |
| 7,224,902 B2 * | 5/2007 | Nishiki | 398/87 |
| 7,308,199 B2 * | 12/2007 | Kim et al. | 398/78 |
| 7,324,754 B2 * | 1/2008 | Kobayashi et al. | 398/77 |
| 7,324,755 B2 * | 1/2008 | Izadpanah | 398/78 |
| 7,330,656 B2 * | 2/2008 | Lee et al. | 398/78 |
| 2002/0163696 A1 * | 11/2002 | Huang et al. | 359/154 |
| 2003/0156847 A1 * | 8/2003 | Nishiki | 398/161 |
| 2004/0081463 A1 * | 4/2004 | Kim et al. | 398/78 |
| 2004/0175188 A1 * | 9/2004 | Bellemare et al. | 398/186 |
| 2004/0218924 A1 * | 11/2004 | Fathallah | 398/77 |
| 2004/0264965 A1 * | 12/2004 | Kobayashi et al. | 398/78 |
| 2005/0100338 A1 * | 5/2005 | Yeon et al. | 398/78 |
| 2005/0226615 A1 * | 10/2005 | Chu et al. | 398/78 |
| 2006/0120434 A1 * | 6/2006 | Fathallah et al. | 375/132 |
| 2006/0156158 A1 * | 7/2006 | Yeon et al. | 714/746 |
| 2006/0209739 A1 * | 9/2006 | Kumar et al. | 370/320 |
| 2008/0107429 A1 * | 5/2008 | Galli et al. | 398/188 |

OTHER PUBLICATIONS

Uri N. Griner et al., "A Novel Bipolar Wavelength-Time Coding Scheme for Optical CDMA Systems", IEEE Photonics Technology Letters, vol. 16, No. 1, Jan. 2004 (pp. 332-334).

Zou Wei et al., "Modified Quadratic Congruence Codes for Fiber Bragg-Grating-Based Spectral-Amplitude-Coding Optical CDMA Systems", Journal of Lightwave Technology, vol. 19, No. 9, Sep. 2001 (pp. 1274-1281).

Raymond M.H.Yim et al., "A New Family of 2-D Wavelength-Time Codes for Optical CDMA With Differential Detection", IEEE Photonics Technology Letters, vol. 15, No. 1, Jan. 2003 (pp. 165-167).

Bong Kyu Kim et al., "Radio-Over-Fiber System Using Fiber-Grating-Based Optical CDMA With Modified PN Codes", IEEE Photonics Technology Letters, vol. 15, No. 10, Oct. 2003 (pp. 1485-1487).

* cited by examiner

TWO-DIMENSIONAL OPTICAL CDMA SYSTEM, PN CODED WAVELENGTH/TIME ENCODER AND DECODER THEREIN, AND METHOD OF ENCODING/DECODING

RELATED APPLICATIONS

The present application is based on, and claims priority from, Korean Application Number 2004-108263, filed Dec. 17, 2004, the disclosure of which is incorporated by reference herein in its entirety.

BACKGROUND OF THE INVENTION

1. Field of the Invention

The present invention relates to an optical code division multiple access (OCDMA) system, and more particularly to a two-dimensional OCDMA system sequentially encoding data bits in time domain and in the wavelength domain using two independent pseudo random noise (PN) sequences, and decoding the encoded results in the wavelength and time domains based on wavelength difference detection (or equal detection of wavelength) such that multiple access interference (MAI) among concurrent users can be removed, and to a wavelength/time sequential encoder and decoder adopted in the OCDMA system. Also the present invention relates to a method of encoding/decoding data bits/decoded results using the same.

2. Description of the Related Art

Generally, research into performance enhancement of an OCDMA system have been proceeded to increase the number of creation code and to reduce noise including MAI among concurrent users. To achieve the above objectives, a method for increasing created code dimension was proposed.

As a prior patent for an encoding/decoding technique of the prior art OCDMA system, U.S. Pat. No. 6,614,950, entitled FIBER BRAGG GRATING-BASED OCDMA ENCODER/DECODER, whose assignee is the National Science Council, discloses a wavelength domain OCDMA system using PN code in one-dimension. In the U.S. patent, the encoder includes a broadband light source, a fiber Bragg grating (FBG) array, and an optical circulator. The FBG array reflects a specific wavelength according to previously allocated PN code and transmits it to a network through the optical circulator to perform wavelength domain encoding. The encoder performs an encoding operation if the data bit is '1' and does not transmit a signal thereto if the data bit is '0.' Also, the decoder includes a pair of FBG arrays, composed according to allocated codes and codes complementary to the allocated codes, and two optical detectors performing wavelength difference detection. Lights passing through the pair of FBG arrays are incident upon the respective optical diodes. If the lights correspond to the codes of the FBG arrays, they are incident upon one photodiode to output a signal '1.' However, if the lights correspond to codes of another users, they are divided to be incident upon two photodiodes. On the other hand, since the length of PN codes used in the prior U.S. patent is odd, MAI occurs. Also, since the encoding and decoding are performed in the one-dimensional wavelength domain, the code number is limited.

In order to overcome the problems in the prior U.S. patent, two dimensional encoding/decoding techniques have been proposed. Namely, a system adopting the prior art encoding/decoding techniques composes a new two-dimensional code created as prime code is combined with optical orthogonal code, and transmits signals based on the combination thereto as FBG arrays corresponding to two pair of Single Pulse Per Row type codes corresponding to '1' and '0' are switched by control signals, respectively. However, the proposed system has disadvantages in that the created code number is limited and, furthermore the subscriber number cannot be secured since two codes are distributed to a single subscriber.

Uri N. Griner and Shlomi Arnon disclosed two-dimensional encoding/decoding techniques [IEEE, Photonics Technology Lett., Vol. 16, No. 1, pp. 332~334, January 2003, titled "A novel bipolar wavelength-time coding scheme for optical CDMA systems"], using bipolar time spreading of a broadband light source and complementary spectral-amplitude-coding, in which two LEDs perform a coding operation in the time domain according to signals '1' and '−1.' After that, another coding operation is performed in the wavelength domain through a diffraction grating. In a receiving unit, wavelength difference detection is performed by two photodiodes to retrieve the signals. The above system employs a Hadamard code for performing a coding operation in the wavelength domain, and a barker code of length, 3, 7 and 11 for performing a coding operation in the time domain. However, the prior art system has disadvantage in that MAI cannot be completely removed therefrom due to inherent characteristics of the barker code adopted in the time domain.

SUMMARY OF THE INVENTION

Therefore, the present invention has been made in view of the above problems, and it is an object of the present invention to provide an OCDMA system sequentially encoding data bits to create matrix type codes using modified PN sequence including stuff bits therein in time domain and in wavelength domain, and sequentially decoding the matrix type codes in wavelength domain and time domain such that MAI among users can be removed and the code number to be used can be increased It is another object of the present invention to provide a wavelength/time sequential encoder and decoder adopted in the OCDMA system.

It is yet another object of the present invention to provide a method of encoding/decoding data bits/encoded results, classifying creation codes, as groups based on characteristics of the creation codes, and synchronously transmitting the codes in the same group thereto to prevent generation of MAI by using all of the created codes.

In accordance with one aspect of the present invention, the above and other objects can be accomplished by the provision of an OCDMA system including a base station connected to a plurality of user terminals, comprising an encoder and a decoder, which are included in each user terminal. The encoder includes: time domain encoding means for creating a time domain code having a sequence according to inputted data bits or a complementary code which is complementary to the time domain code; optical modulation means for selectively outputting lights, in which the lights are incident upon the optical modulation means from the outside, to two output leads, respectively, according to a chip bit of the time domain code or the complementary code; and wavelength domain encoding means for generating a two-dimensional code by encoding the light outputted from the first output lead of the optical modulation means into a wavelength domain sequence and the complementary two-dimensional code which is complementary to the two-dimensional code by encoding the light outputted from the second output lead of the optical modulation means into a complementary sequence of the wavelength domain sequence, and transmitting the two-dimensional code and the complementary two-dimensional code to the base station. The decoder includes: wavelength decoding means for receiving an optical signal code encoded by the encoder from the base station, and decoding the optical signal code in wavelength domain to output an electric signal thereto; time domain decoding means for decoding the electric signal in time domain; and threshold determination means for determining whether the decoded signal in the time domain decoding means is a threshold, and outputting data bits based on the determination.

Preferably, the time domain encoding means may include a pattern generator for outputting a time domain PN sequence having a pattern according to inputted data bits and a complementary sequence which is complementary to the time domain PN sequence.

Preferably, the wavelength domain encoding means may includes: an FBG array arranged to an optical signal line connected to the second output lead of the optical modulation means; and an optical circulator for receiving the light outputted from the first output lead to input it to the FBG array in the reverse direction thereof such that the FBG array reflects to output the two-dimensional code encoded in wavelength domain modified PN sequence thereto, and allowing the light outputted from the second output lead to be passed through the FBG array such that the complementary two-dimensional code of the two dimensional code encoded in a complementary sequence of the wavelength domain modified PN sequence is outputted.

Preferably, the wavelength domain decoding means may include: an optical circulator for inputting an optical signal encoded by the encoder through a first lead to output it to a second lead, and outputting a signal inputted by the second lead to a third lead; an FBG array arranged on an optical line connected to the second lead of the optical circulator; and first and second optical detectors connected to one another in series, wherein a optical signal outputted from the second lead of the optical circulator and reflected from the FBG array is decoded into a decoding code, the length of which is the same as that of the wavelength domain modified PN sequence, and the decoding code is outputted through the third lead to input it to the first optical detector, a optical signal outputted from the second lead and passed through the FBG array is decoded to the complementary code which is complementary to the decoding code to input it to the second optical detector, and the first and second optical detectors convert the decoded optical signals into electrical signals in wavelength difference detection, and then output the electric signals thereto.

Preferably, the time domain decoding means may include an electrical multiplying element for multiplying an electric signal outputted from the wave domain decoding means by the time domain code or the complementary code of the time domain code. The plurality of user terminals form a plurality of groups each of which includes more than one user terminal, in which the user terminal has an encoder, in which time domain encoding means of the encoder outputs time domain modified PN sequences different from one another. The number of chip bits in the time domain modified PN sequence is greater by one than that of the user terminal included in one group. The time domain modified PN sequence includes stuff bits.

Preferably, the wavelength domain encoding means in the plurality of groups performs an encoding operation using the same wavelength domain modified PN sequence. The number of the chip bits in wavelength domain modified PN sequence is preferably greater by one than that of the group. The wavelength domain modified PN sequence preferably includes stuff bits.

Preferably, the two-dimensional code may be a matrix type code, which includes a row composed of the time domain sequence and a column composed of the wavelength domain sequence according to the time domain sequence, or which includes a column composed of the time domain sequence and a row composed of the wavelength domain sequence according to the time domain sequence.

In accordance with another aspect of the present invention, the above and other objects can be accomplished by the provision of an encoder included in each of a plurality of user terminals connected to a base station, in which the plurality of user terminals are included in an OCDMA system. The encoder includes: time domain encoding means for creating a time domain code having a sequence according to inputted data bits or a complementary code which is complementary to the time domain code; optical modulation means for selectively outputting lights, in which the lights are incident upon the optical modulation means from the outside, to two output leads, respectively, according to a chip bit of the time domain code or the complementary code; and wavelength domain encoding means for generating a two-dimensional code by encoding the light outputted from the first output lead of the optical modulation means into a wavelength domain sequence and the complementary two-dimensional code which is complementary to the two-dimensional code by encoding the light outputted from the second output lead of the optical modulation means into a complementary sequence of the wavelength domain sequence, and transmitting the two-dimensional code and the complementary two-dimensional code to the base station.

In accordance with further aspect of the present invention, the above and other objects can be accomplished by the provision of a decoder decoding two-dimensional codes of optical signals, which are sequentially encoded in time domain and in wavelength domain and then transmitted by the base station. The decoder includes: wavelength decoding means for receiving an optical signal code encoded by the encoder from the base station, and decoding the optical signal code in wavelength domain to output an electric signal thereto; time domain decoding means for decoding the electric signal in time domain; and threshold determination means for determining whether the decoded signal in the time domain decoding means is a threshold, and outputting data bits based on the determination.

In accordance with yet another aspect of the present invention, the above and other objects can be accomplished by the provision of a method of encoding/decoding data bits in an OCDMA system including a plurality of user terminals connected to a base station. The method includes the steps of: generating a time domain code having a sequence according to the data bits or a complementary code which is complementary to the time domain code, and encoding the data bits in time domain, based on the generation; transmitting two dimensional code or a complementary code of the two dimensional code, in which the two dimensional code is generated as light inputted from the outside is encoded into a wavelength domain sequence and the complementary code is generated as the inputted light is encoded into a complementary sequence of the wavelength domain sequence, according to chip bits of the time domain code or the complementary code which is complementary to the time domain code; receiving the encoded light signal from a network and decoding it in the wavelength domain to an electric signal to be outputted; decoding the electric signal in the time domain; and determining whether the decoded signal decoded in the time domain is a threshold and outputting data bits thereto.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
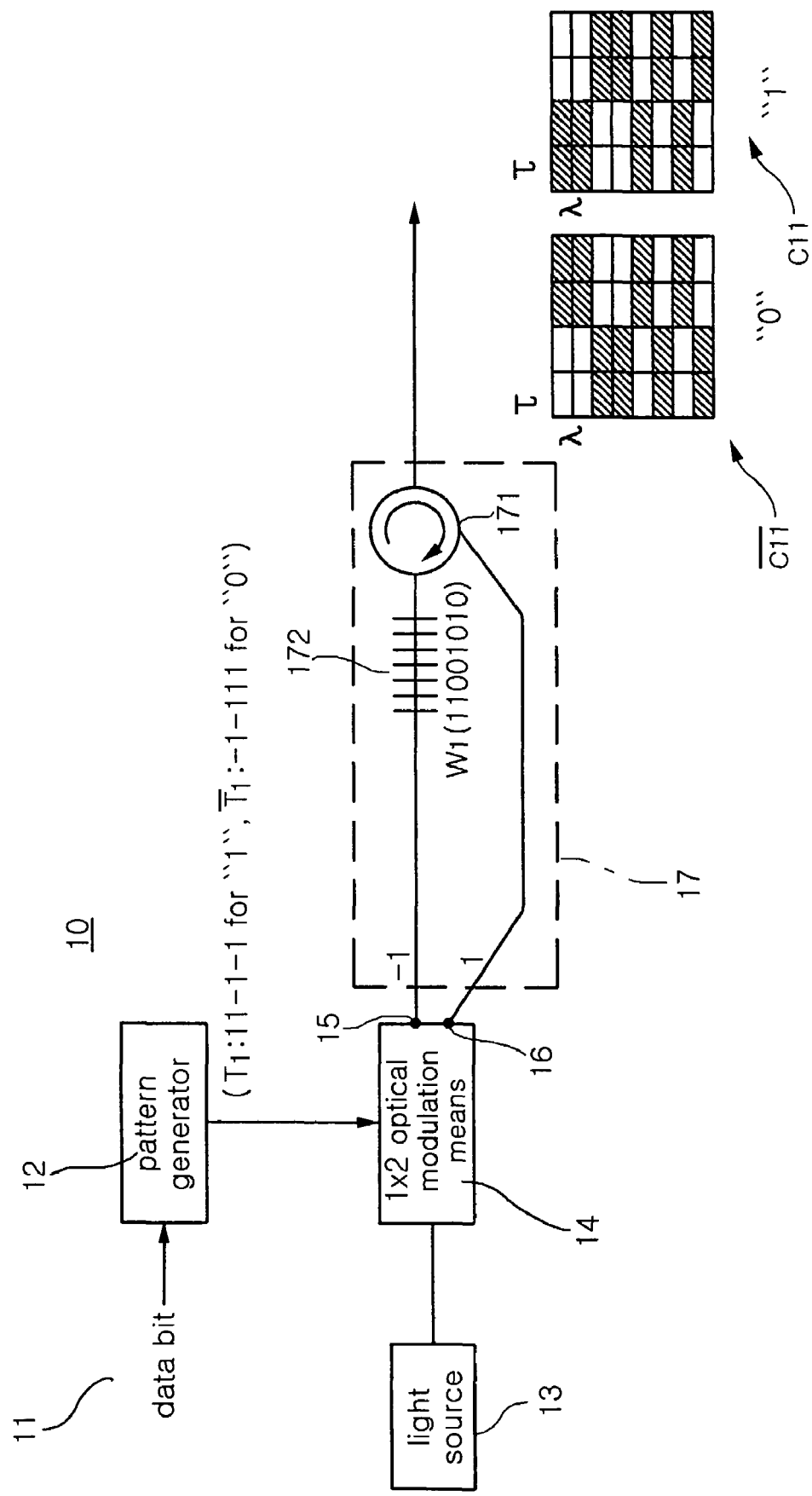
FIG. 1a is a schematic block diagram illustrating an encoder included in an OCDMA system according to the present invention.

Now, preferred embodiments of the present invention will be described in detail with reference to the annexed drawings. In the drawings, the same or similar elements are denoted by the same reference numerals even though they are depicted in different drawings.

Figure 1B:
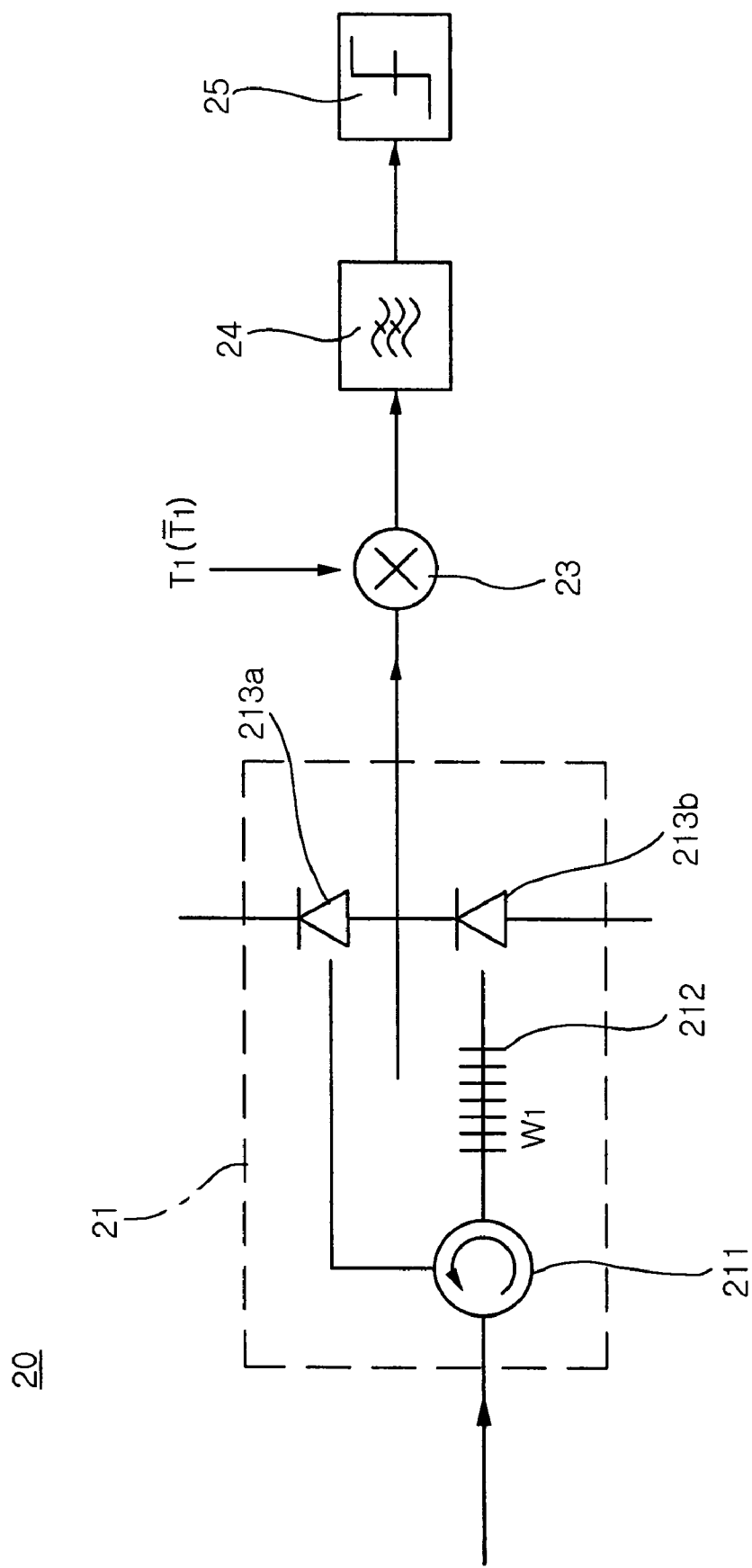
FIG. 1b is a schematic block diagram illustrating a decoder included in an OCDMA system according to the present invention.

FIG. 1a and FIG. 1b are views illustrating a two dimensional OCDMA system according to the present invention. The two dimensional OCDMA system of the present invention includes a plurality of user terminals each of which includes an encoder and a decoder. The encoder encodes data bits and then transmits the encoded result thereto and the decoder decodes inputted light signal. FIG. 1a is a schematic block diagram illustrating an encoder included in an OCDMA system according to the present invention and FIG. 1b is a schematic block diagram illustrating a decoder included in an OCDMA system according to the present invention.

With reference to FIGS. 1a and 1b, the two-dimensional OCDMA system according to an embodiment of the present invention includes an encoder 10 and a decoder 20.

The encoder 10 includes time domain encoding means 12 for generating a time domain code having sequences $T_1$ and $\bar{T}_1$ according to inputted data bits 11 or a complementary code which is complementary to the time domain code; an optical modulation means 14 for selectively outputting lights, in which the lights are incident upon the optical modulation means 14 from the outside, to two output leads 15 and 16, respectively, according to a chip bit in the time domain code or the complementary code which is complementary to the time domain code; and a wavelength domain encoding means 17 for encoding the light as a wavelength domain sequence, in which the light is outputted from a first output lead 16 of the optical modulation means 14, transmitting a two-dimensional code to the base station, encoding the light as a complementary sequence of a wavelength domain sequence, in which the light is outputted from a second output lead 15 of the optical modulation means 14, and transmitting the complementary code base on the two dimensional code to the base station.

The decoder 20 includes wavelength decoding means 21 for receiving an optical signal code encoded by the encoder from the base station and decoding the optical signal code in wavelength domain to output an electrical signal thereto; a time domain decoding means 23 for decoding the electrical signal outputted from the wavelength domain decoding means 21 in time domain; and a threshold determination means 25 for determining whether the decoded signal in the time domain decoding means 23 is a threshold and outputting data bits based on the determination.

Figure 2:
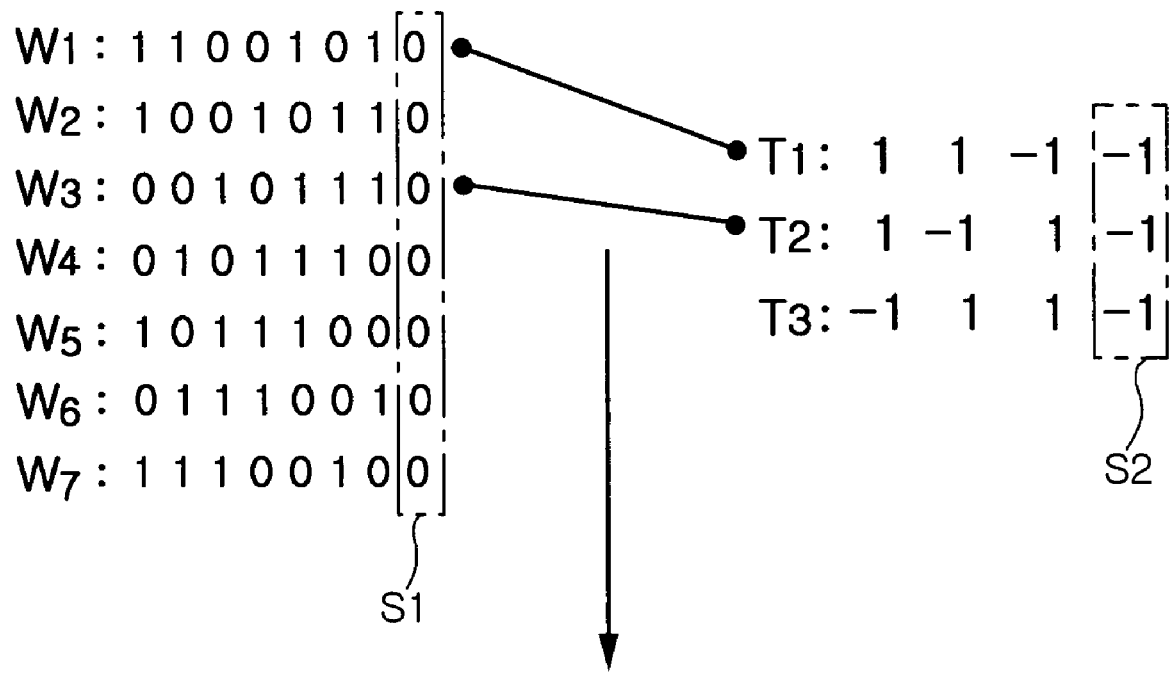
FIG. 2 is a view illustrating an example of a chip-bit sequence used when an encoding operation is performed according to the present invention.

The encoder 10 of the OCDMA system according to the present invention performs sequential encoding in time domain and in wavelength domain. Also, the decoder 20 sequentially decodes in the wavelength domain and in the time domain. With reference to FIG. 2, a chip bit sequence used in the encoding operation of the present invention is described in detail in order to describe an encoding procedure performed in the encoder 10.

FIG. 2 is a view illustrating an example of a chip-bit sequence used when an encoding operation is performed according to the present invention. Since encoding procedures are preformed in the wavelength domain and the time domain, respectively, each domain uses independent chip-bit sequences. As shown in FIG. 2, modified sequences $W_1$ to $W_7$, which are formed as a stuff bit S1 is added to PN sequences of 7 chip bits, can be used to be performed an encoding operation in the wavelength domain. Also, modified sequences $T_1$ to $T_3$, which are formed as a stuff bit S2 is added to the PN sequence of 3 bits, can be used to be performed an encoding operation in the time domain. Namely, the modified PN sequences, which are used in the wavelength domain and the time domain of the present invention, include stuff bits. Also, since the modified PN sequences $T_1$ to $T_3$ used in the time domain occur in an electric domain, '−1' is used instead of '0.'

In the prior PN sequences, the difference between the numbers of '0 (or −1)' and '1' is always one bit. In this case, if data transmission/reception is performed using a modified PN sequence, interference occurs between CDMA channels different from one another due to the difference between the numbers '0 (or −1)' and '1.' In order to reduce such interference, if stuff bits are added to a predetermined column of the PN sequence such that the number of '0 (or −1)' is the same as that of '1,' interference between the CDMA channels different from one another can be removed therefrom. Although FIG. 2 depicted as an example indicating that a final chip bit of modified PN sequences $W_1$ to $W_7$ and $T_1$ to $T_3$ is a stuff bit, the column of the stuff bit can be determined arbitrarily. Here, the stuff bit must be present in the same column in all of the modified PN sequences. In the present invention, the PN sequence indicative of a modified PN sequence including the stuff bits.

Since the encoding procedure is sequentially performed in the time domain and in the wavelength domain, the present invention performs based on a new type code which is created as the modified PN sequence of the time domain is combined with that of the wavelength domain. For example, as shown in FIG. 2, a modified PN sequence denoted by $W_1$ in the wavelength domain and a modified PN sequences denoted by $T_1$ in the time domain can be combined with to each other to create a new code $C_{11}$ (=$W_1 \oplus T_1$). Also, a modified PN sequence denoted by $W_3$ in the wavelength domain and a modified PN sequence denoted by $T_2$ in the time domain can be combined with to each other to create a code $C_{32}$ (=$W_3 \oplus T_2$). These new codes are matrix type codes each of which is composed of rows including modified PN sequences of the time domain and columns including modified PN sequences of the wavelength domain according to the modified PN sequences of the time domain. Also, these new codes may be matrix type codes each of which is composed of columns including modified PN sequences of the time domain and rows including modified PN sequences of the wavelength domain according to the modified PN sequences of the time domain. The matrix type two-dimensional codes are described in detail below.

Figure 3A:
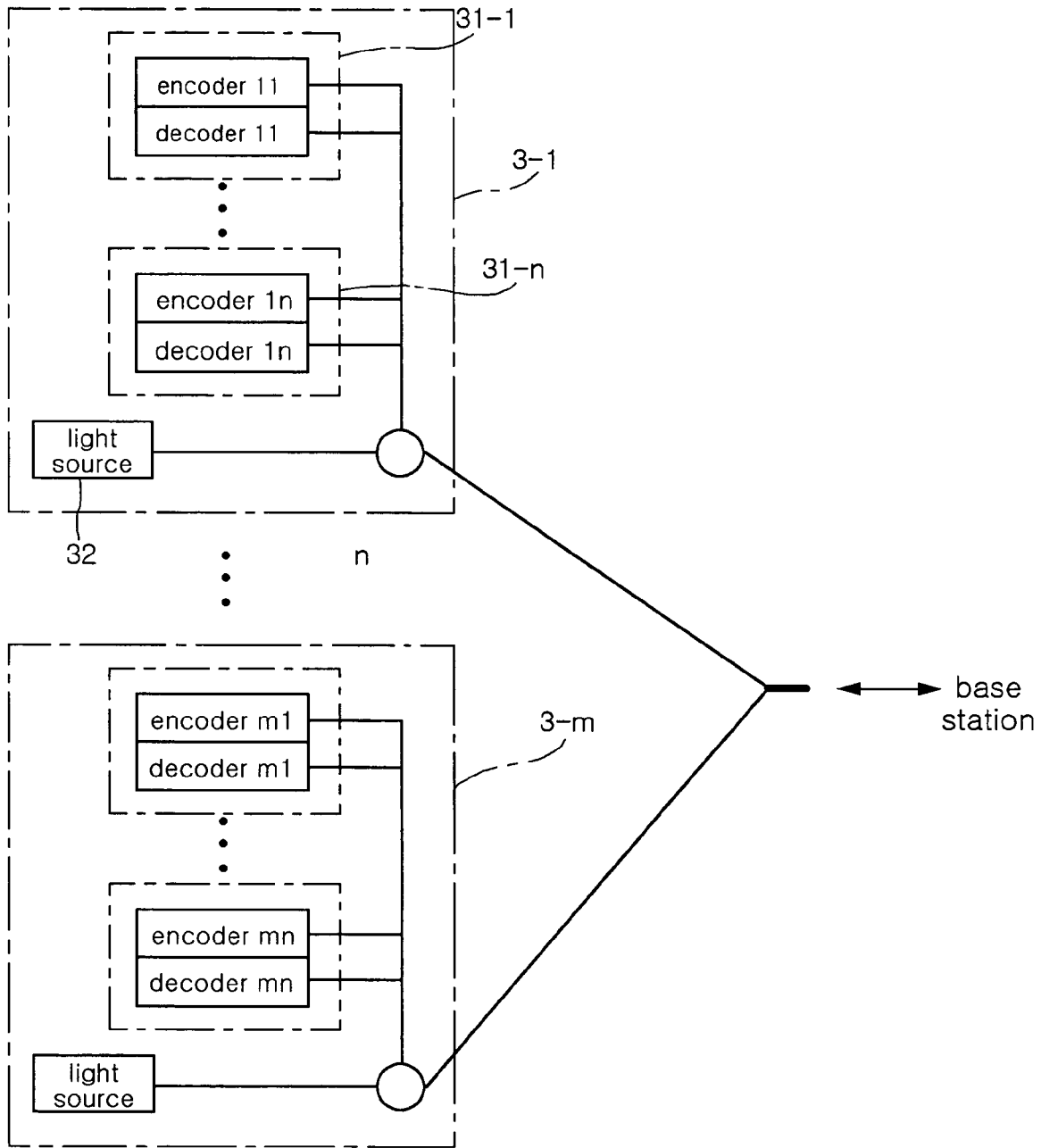
FIG. 3a and FIG. 3b are views according to connection of subscribers and a base station in the OCDMA system.
Figure 3B:
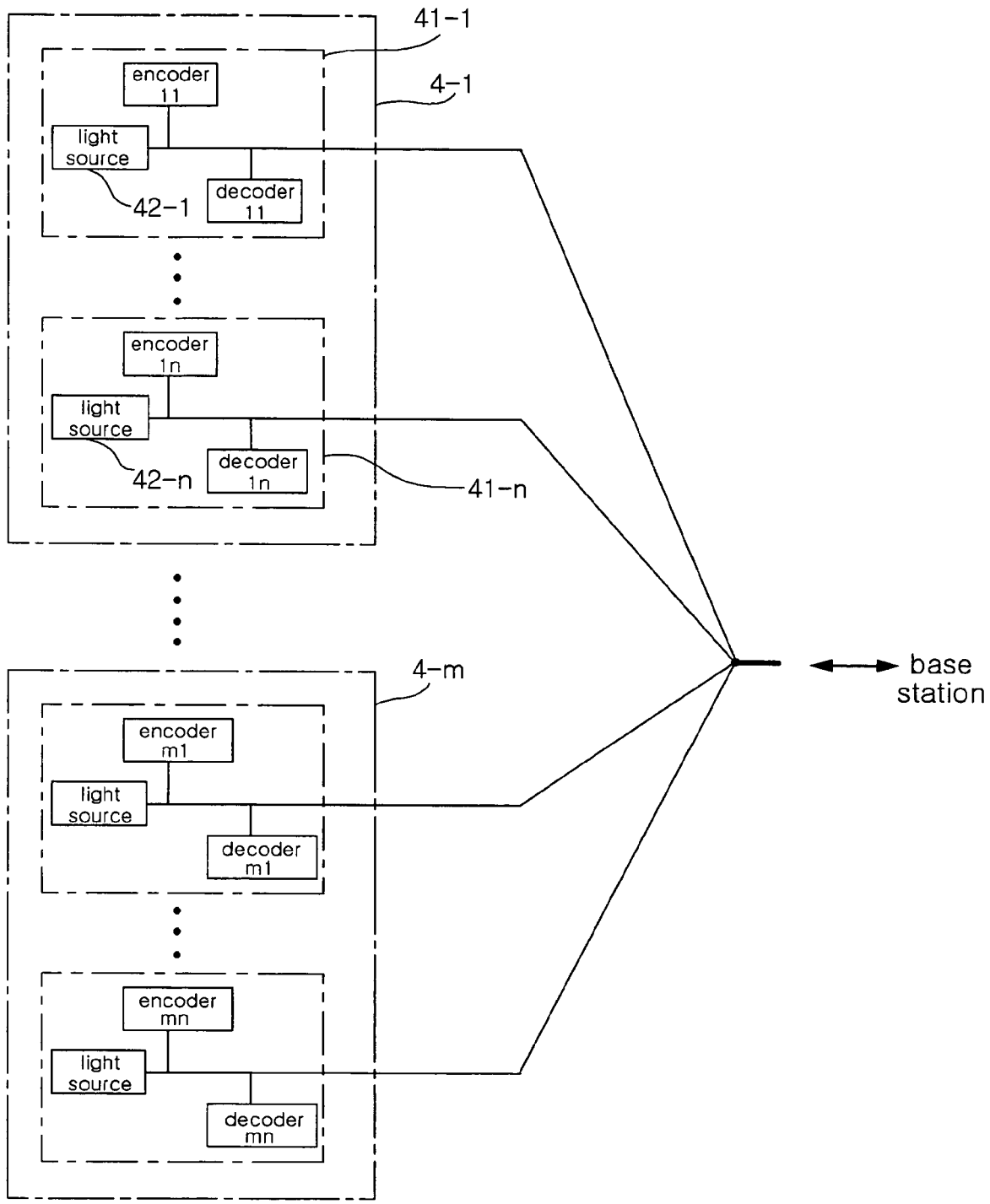

On the other hand, the chip bit number of modified PN sequence used in the present invention is associated with the number of the user terminals included in the OCDMA system and the number of the groups each of which is composed of more than one of the user terminal. Such association is described in detail with reference to FIG. 3a and FIG. 3b. FIG. 3a and FIG. 3b are views according to connection of subscribers and a base station in the OCDMA system.

Referring to FIG. 3a, one way of connections is implemented such that a light source 32 is shared by n subscriber terminals, 31-1 to 31-n, which are included in a group 3-1. The OCDMA system includes a plurality of groups 3-1 to 3-m each of which includes more than one subscriber terminal. In this connection, the number of light sources can be relatively reduced, compared with the prior art system, as one light source 32 is shared by the subscriber terminals included in a single group. In the OCDMA system, when n subscriber terminals 31-1 to 31-n, included in a single group (for example, 3-1), perform an encoding operation in wavelength domain, they use the same modified PN sequence patterns. On the other hand, when the n subscriber terminals 31-1 to 31-n perform an encoding operation in time domain, they use modified PN sequence patterns which are different from one another. Namely, if K subscriber terminals are connected to a base station in the OCDMA system, in which the K subscriber terminals form m groups therein, each of which is composed of n subscriber terminals, a wavelength domain modified PN sequence, composed of m+1 chip bits to perform a wavelength encoding operation, and a time domain modified PN sequence, composed of n+1 chip bits, are needed because stuff bit is added to PN sequence one by one in the present invention.

Referring to FIG. 3b, connection is implemented such that the respective light sources 42-1 to 42-n are allocated to the respective subscriber terminals 41-1 to 41-n. In this connection, since the respective subscriber terminals 41-1 to 41-n include the respective light sources 42-1 to 42-n, although the present invention needs relatively large cost, the present invention has advantages in that the system can be easily installed thereinto. Similarly, the present invention also includes a plurality of groups 4-1 to 4-m including more than one subscriber terminal. Similar to the description as shown in FIG. 3, when n subscriber terminals 41-1 to 41-n included in a single group (for example, 4-1) perform an encoding operation in wavelength domain, they use the same modified PN sequence patterns. On the other hand, when the n subscriber terminals 41-1 to 41-n perform an encoding operation in time domain, they use the modified PN sequence patterns which are different from one another. Also, when performing an encoding operation in the wavelength domain, the respective groups 4-1 to 4-m use modified PN sequence patterns different from one another. In the OCDMA system adopting the connection fashion of FIG. 3b, the chip bit number of modified PN sequences for performing a decoding operation in the time domain and in the wavelength domain is the same as that of FIG. 3a.

More specifically, the OCDMA system of one embodiment of the present invention is described below with reference to FIG. 1a and FIG. 1b.

FIG. 1a illustrates an encoder included in each of a plurality of subscriber terminals connected to a base station in the OCDMA system according to one embodiment of the present invention. As mentioned above, the encoder 10 includes time domain encoding means 12, an optical modulation means 14, and wavelength domain encoding means 17.

The time domain encoding means 12 creates a time domain code having sequences $T_1$ and $\overline{T}_1$ according to inputted data bits 11 or a complementary code which is complementary to the time domain code. The time domain encoding means 12 may be implemented with a pattern generator which is capable of outputting a time domain modified PN sequence having a pattern according to inputted data bits or a complementary sequence of the time domain modified PN sequence. For example, the pattern generator 12 outputs a modified PN sequence based on chip-bit rate units of [1 1 −1 −1], as shown by $T_1$ in FIG. 2, if the inputted data bit is '1.' Also, the pattern generator 12 outputs a modified PN sequence of [−1 −1 1 1] which is complementary to $T_1$, if the inputted data bit is '0.'

The optical modulation means 14 selectively outputs lights inputted from the outside to two output leads 15 and 16, according to a chip bit of [1 1 −1 −1] of the time domain code $T_1$ or [−1 −1 1 1] of the complementary code $\overline{T}_1$ which is complementary to the time domain code. Namely, the optical modulation means 14 outputs light incident upon a first output lead 15 thereto if the inputted chip bit is '−1,' and light incident upon a second output lead 16 thereto if the inputted chip bit is '1.'

The wavelength domain encoding means 17 encodes the light as a wavelength domain sequence, in which the light is outputted from the second output lead 16 of the optical modulation means 14, and transmits a two-dimensional code to the base station. Also, the wavelength domain encoding means 17 encodes the light as a complementary sequence of a wavelength domain sequence, in which the light is outputted from a first output lead 15 of the optical modulation means 14, and transmits the complementary code of the two-dimensional code to the base station.

The wavelength domain encoding means 17 includes an FBG array 172 and an optical circulator 171. The FBG array 172 is arranged based on an optical signal line connected to the first output lead 15 of the optical modulation means 14. The optical circulator 171 receives the light outputted from the second output lead 16 to input it to the FBG array 172 in the reverse direction thereof such that the FBG array 172 reflects the light to output a two dimensional code encoded based on a wavelength domain modified PN sequence thereto, and allows the light outputted from the first output lead 15 to be passed through the FBG array 172 such that a complementary code of the two dimensional code encoded based on a complementary sequence of the wavelength domain modified PN sequence is outputted.

For example, an encoding procedure of a wavelength domain is described in detail below, with reference to $W_1$ of wavelength domain modified PN sequences, as shown in FIG. 2. Firstly, if data bit '1' is inputted to the time domain encoding means 12, a time domain code of $T_1$ [1 1 −1 −1] is inputted to the optical modulation means 14. If a chip bit of '1' in $T_1$ is inputted to the optical modulation means 14, light incident upon the optical modulation means 14 from the outside is outputted to the second output lead 16. The light outputted to the second output lead 16 is inputted to an input terminal of the optical circulator 171 to be entered into the FBG array 172 in the reverse direction. The FBG array 172 selectively reflects a wavelength of the light incident thereon in the reverse direction such that a pulse having a wavelength corresponding to $W_1$ [1 1 0 0 1 0 1 0] is created. Namely, the FBG array 172 is designed such that light is reflected, in which the light corresponds to '1' in a modified PN sequence, such as $W_1$ [1 1 0 0 1 0 1 0] of FIG. 2. On the other hand, if a chip bit '−1' in $T_1$ is inputted in the optical modulation means 14, the light incident upon the optical modulation means 14 from the outside is outputted to the first output lead 16. As mentioned above, since the FBG array 172 reflects light having an optical wavelength corresponding to '1' of $W_1$ of FIG. 2, lights corresponding to the remaining wavelengths thereof pass through the FBG array 172. Namely, a complementary sequence of $W_1$ is inputted to the optical circulator 172 to be outputted.

As such, while a time domain code corresponding to data bit '1' is inputted to the optical modulation means 14, an encoding operation for each chip bit of the time modified PN code $T_1$ [1 1 −1 −1] is performed in wavelength domain. After that, a matrix type two-dimensional code such as $C_{11}$ is created. When data bit '0' is inputted, since a time domain modified PN code, complementary to a state wherein data bit '1' is inputted, is inputted to the optical modulation means 14, two-dimensional code such as $\overline{C_{11}}$ is created. As shown in FIG. 1a, $C_{11}$ and $\overline{C_{11}}$ are complementary to one another based on two dimensions.

As such, an encoded optical signal is outputted from an encoder of a subscriber terminal and transmitted to a base station. The base station maintains synchronization of the optical signals transmitted from the same group thereto. Therefore, if optical signals are synchronously transmitted in the same group, interference between codes can be ignored such that multiple access interference (MAI) can be eliminated. Such synchronization among optical signals can be similarly adopted in a situation wherein an encoded optical signal is transmitted from the base station to the decoder of the subscribe group.

FIG. 1b illustrates a decoder of optical subscriber terminals included in an OCDMA system according to the present invention. As mentioned above, the decoder 20 includes a wavelength domain decoding means 21, a time domain decoding means 23 and a threshold determination means 25.

The wavelength domain decoding means 21 includes an optical circulator 211 for inputting an optical signal encoded by the encoder through a first lead to output it to a second lead, and outputting a signal inputted by the second lead to a third lead; an FBG array 212 arranged on an optical line connected to the second lead of the optical circulator; and first and second optical detectors 213a and 213b connected to one another in series.

Here, the optical signal outputted from the second lead of the optical circulator 211 and reflected from the FBG array 212 is decoded, such that the length of the optical signal is the same as that of the wavelength domain modified PN sequence, and the decoded result is outputted through the third lead to input it to the first optical detector 213a, the optical signal outputted from the second lead and passed through the FBG array 212 is decoded to the complementary code which is complementary to the decode code to input it to the second optical detector 213b. Also, the first and second optical detectors 213a and 213b convert the decoded optical signals into electrical signals in wavelength difference detection (or equal detection of wavelength), and then output the electrical signals thereto.

The time domain decoding means 23 decodes the electrical signals outputted from the wavelength domain decoding means 21 in time domain. The time domain decoding means 23 includes an electrical multiplying element for multiplying an electrical signal outputted from the wave domain decoding means 21 by the time domain code or the complementary code of the time domain code.

The threshold determination means 25 determines whether the decoded signal in the time domain is a threshold and outputs data bits based on the determination.

On the other hand, a low pass filter 24 may be further installed between the time domain decoding means 23 and the threshold determination means 25 such that noise components in the electric signals decoded in the time domain can be eliminated.

Figure 4:
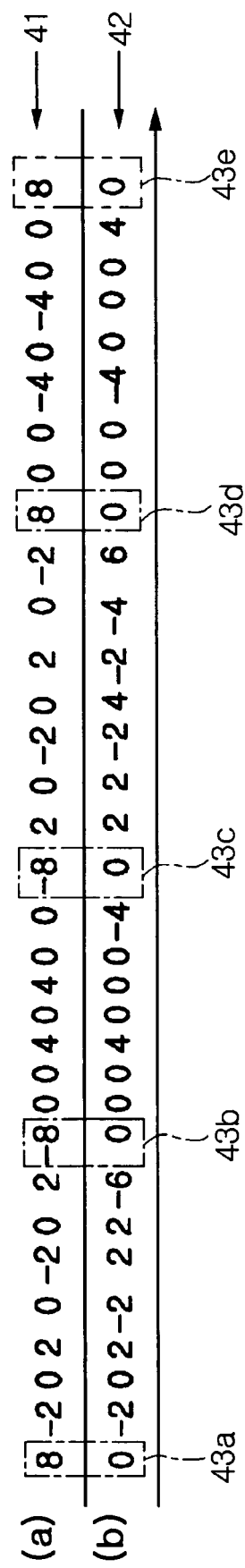
FIG. 4 is a view illustrating an example of a decoded result according to the present invention.

FIG. 4 is a view illustrating a decoded result including codes $C_{11}$ and $\overline{C_{11}}$ and $C_{12}$ and $\overline{C_{12}}$, which are included in the same group in the OCDMA system. Namely, the decoding results are decoded from signals encoded as codes $C_{11}$ and $\overline{C_{11}}$ from data bit [1 0 0 1], as shown in FIG. 1a. Two types of peaks '8' and '−8' in reference numeral 41, as shown in FIG. 4, are signals corresponding to a state wherein desired signals are received without delay. Especially, the signals are received while the peaks in reference numeral 41 are synchronized with '0' shown in reference numeral 42, which are shown by reference numerals 43a to 43e. Therefore, if a threshold (for example, 7) is determined based on the result, transmission/reception of the codes can be performed without interference of other codes. Namely, since synchronous OCDMA transmission can be performed between codes included in the same group, a system can be constructed to prevent generation of interference.

Figure 5:
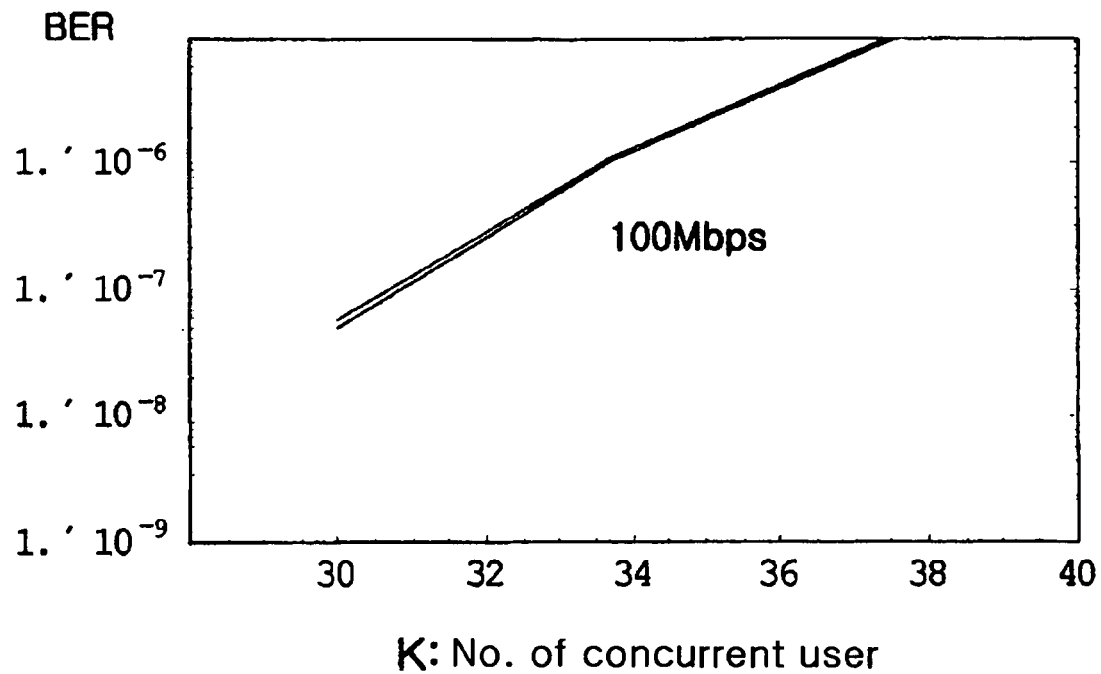
FIG. 5 is a graph illustrating a calculation result of bit error ratio (BER) curves of an OCDMA system according to the present invention.

FIG. 5 is a graph illustrating a calculation result of a bit error ratio (BER) to confirm performance of an OCDMA system according to the present invention, considering excess intensity noises, which are a kind of shot noise, thermal noise and beat noise. More specifically, the graph of BER is induced while received optical power $P_{rec}$ is varied from −25 dbm to 13 dbm. With reference to FIG. 5, although the received optical power is varied, it is easily appreciated that optical output intensity does not affect the BER characteristics. Such a result means that the number of concurrent users is largely dependent on excess intensity noises.

Figure 6:
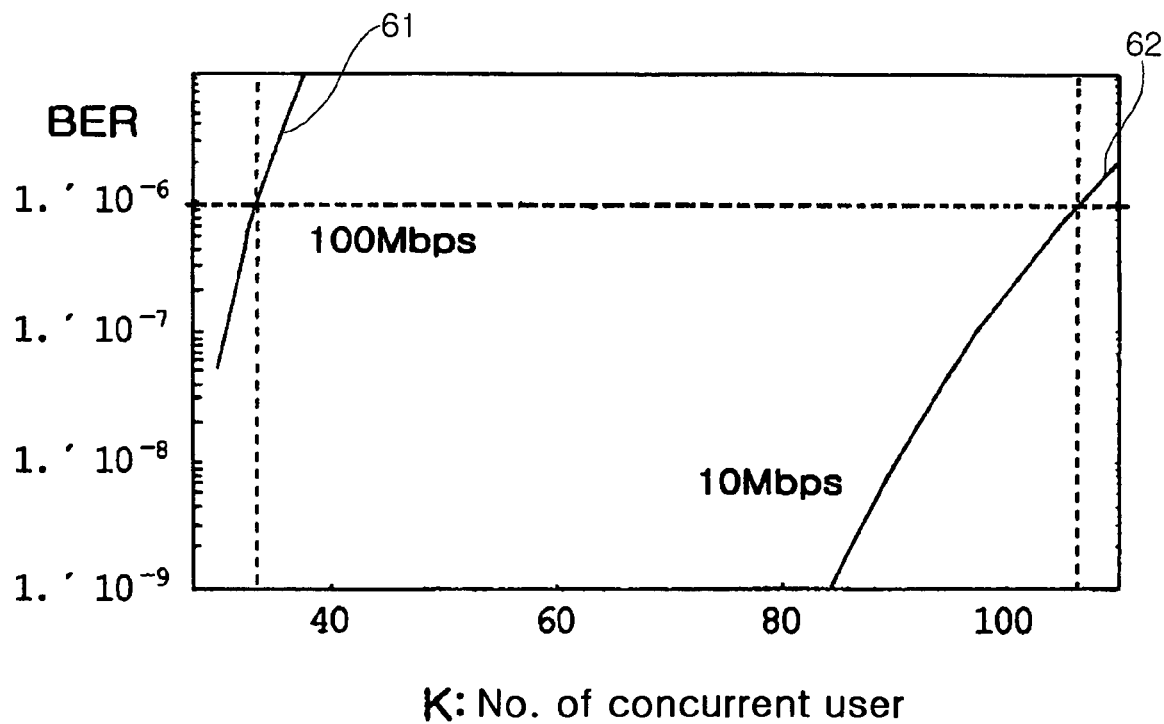
FIG. 6 is a graph illustrating BER results when performing data transmission based on bit rates of 100 Mbps and 10 Mbps in an OCDMA system according to the present invention.

FIG. 6 is a graph illustrating a BER result when performing data transmission based on bit rates of 100 Mbps and 10 Mbps in an OCDMA system according to the present invention, considering various types of noise as illustrated in FIG. 5. At a BER of $10^{-6}$ generally allowed in a subscriber network, it is appreciated that the number of concurrent users may be allowed up to 34 for 100 Mbps and 106 for 10 Mbps. To generate code number which is satisfied with BER and the number of concurrent users, a code size can be set as the following: For 100 Mbps, code length is 64 (W=16; T=4 or W=8; T=8) and 34 codes of the created codes are allocated to subscribers; for 10 Mbps, code length is 168 (W=16; T=8) and 105 codes, which are all of the created codes, are used. Therefore, since the present invention uses codes, which encoded based on two-dimension in the wavelength domain and the time domain, code number can be increased and thusly the subscriber number can be also increased.

According to the present invention, data bits are sequentially encoded based on a chip-bit rate to generate matrix type codes, using modified PN sequences which include stuff bits in time domain and in wavelength domain, respectively, and then the matrix type codes are sequentially decoded in the wavelength domain and in the time domain. Therefore, the number of codes to be used can be increased, thereby increasing the subscriber number.

Also, the present invention can eliminate MAI among users as optical signals of the user terminals in the same group are synchronized to one another.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An OCDMA system including a base station connected to a plurality of user terminals, comprising:
   an encoder in each user terminal including:
      time domain encoding means for creating a time domain code having a sequence according to inputted data bits or a complementary code which is complementary to the time domain code;
      optical modulation means for selectively outputting lights, in which the lights are incident upon the optical modulation means from the outside, to two output leads, respectively, according to a chip bit of the time domain code or the complementary code; and
      wavelength domain encoding means for generating a two-dimensional code by encoding the light outputted from the first output lead of the optical modulation means into a wavelength domain sequence and the complementary two-dimensional code which is complementary to the two-dimensional code by encoding the light outputted from the second output lead of the optical modulation means into a complementary sequence of the wavelength domain sequence, and transmitting the two-dimensional code and the complementary two-dimensional code to the base station; and
   a decoder in each user terminal including:
      wavelength decoding means for receiving an optical signal code encoded by the encoder from the base station, and decoding the optical signal code in wavelength domain to output an electric signal thereto;
      time domain decoding means for decoding the electric signal in time domain; and threshold determination means for determining whether the decoded signal in the time domain decoding means is a threshold, and outputting data bits based on the determination,
   wherein the two-dimensional code is a matrix type code generated from two different PN sequences including a time domain PN sequence in a first dimension and a wavelength domain PN sequence in a second dimension.

2. The system as set forth in claim 1, wherein the time domain encoding means includes a pattern generator for outputting the time domain PN sequence having a pattern according to inputted data bits and a complementary sequence which is complementary to the time domain PN sequence.

3. The system as set forth in claim 1, wherein the wavelength domain encoding means includes:
   an FBG array arranged to an optical signal line connected to the second output lead of the optical modulation means; and
   an optical circulator for receiving the light outputted from the first output lead to input it to the FBG array in the reverse direction thereof such that the FBG array reflects to output the two-dimensional code encoded in the wavelength domain PN sequence thereto, and allowing the light outputted from the second output lead to be passed through the FBG array such that the complementary two-dimensional code of the two dimensional code encoded in a complementary sequence of the wavelength domain PN sequence is outputted.

4. The system as set forth in claim 1, wherein the wavelength domain decoding means includes:
   an optical circulator for inputting an optical signal encoded by the encoder through a first lead to output it to a second lead, and outputting a signal inputted by the second lead to a third lead;
   an FBG array arranged on an optical line connected to the second lead of the optical circulator; and
   first and second optical detectors connected to one another in series,
   wherein a optical signal outputted from the second lead of the optical circulator and reflected from the FBG array is decoded into a decoding code, the length of which is the same as that of the wavelength domain PN sequence, and the decoding code is outputted through the third lead to input it to the first optical detector, a optical signal outputted from the second lead and passed through the FBG array is decoded to the complementary code which is complementary to the decoding code to input it to the second optical detector, and the first and second optical detectors convert the decoded optical signals into electrical signals in wavelength difference detection, and then output the electric signals thereto.

5. The system as set forth in claim 1, wherein the time domain decoding means includes an electrical multiplying element for multiplying an electric signal outputted from the wave domain decoding means by the time domain code or the complementary code of the time domain code.

6. The system as set forth in claim 2, wherein the plurality of user terminals form a plurality of groups each of which includes more than one user terminal, in which the user terminal has an encoder, in which time domain encoding means of the encoder outputs time domain PN sequences different from one another.

7. The system as set forth in claim 6, wherein the number of the chip bits in the time domain PN sequence is greater by one than that of the user terminal included in one group.

8. The system as set forth in claim 3, wherein the plurality of user terminals connected to the base station form a plurality of groups therein, each of which includes more than one user terminal, in which the user terminal has an encoder, in which wavelength domain encoding means performs an encoding operation using the same wavelength domain PN sequence.

9. The system as set forth in claim 8, wherein the number of the chip bits in the wavelength domain PN sequence is greater by one than that of the group.

10. The system as set forth in claim 1, wherein the two-dimensional code includes a row composed of the time domain PN sequence and a column composed of the wavelength domain PN sequence according to the time domain PN sequence, or which includes a column composed of the time domain PN sequence and a row composed of the wavelength domain PN sequence according to the time domain PN sequence.

11. The system as set forth in claim 6 or 8, wherein the base station maintains synchronization between codes received from more than one subscriber included in the same group and between the codes transmitted from the more than one subscriber included in the same group.

12. An encoder included in each of a plurality of user terminals connected to a base station, in which the plurality of user terminals are included in an OCDMA system, comprising:

time domain encoding means for creating a time domain code having a sequence according to inputted data bits or a complementary code which is complementary to the time domain code;

optical modulation means for selectively outputting lights, in which the lights are incident upon the optical modulation means from the outside, to two output leads, respectively, according to a chip bit of the time domain code or the complementary code; and wavelength domain encoding means for generating a two-dimensional code by encoding the light outputted from the first output lead of the optical modulation means into a wavelength domain sequence and the complementary two-dimensional code which is complementary to the two-dimensional code by encoding the light outputted from the second output lead of the optical modulation means into a complementary sequence of the wavelength domain sequence, and transmitting the two-dimensional code and the complementary two-dimensional code to the base station, wherein the two-dimensional code is a matrix type code generated from two different PN sequences including a time domain PN sequence in a first dimension and a wavelength domain PN sequence in a second dimension.

13. The encoder as set forth in claim 12, wherein the time domain encoding means includes a pattern generator for outputting the time domain PN sequence having a pattern according to inputted data bits and a complementary sequence which is complementary to the time domain PN sequence.

14. The encoder as set forth in claim 12, wherein the wavelength domain encoding means includes:

an FBG array arranged to an optical signal line connected to the second output lead of the optical modulation means; and an optical circulator for receiving the light outputted from the first output lead to input it to the FBG array in the reverse direction thereof such that the FBG array reflects to output the two-dimensional code encoded in the wavelength domain PN sequence thereto, and allowing the light outputted from the second output lead to be passed through the FBG array such that the complementary two-dimensional code of the two dimensional code encoded in a complementary sequence of the wavelength domain PN sequence is outputted.

15. The encoder as set forth in claim 13, wherein the plurality of user terminals form a plurality of groups therein, each of which includes including more than one user terminal, in which the user terminal has an encoder, in which a time domain encoding means of the encoder outputs time domain PN sequences different from one another.

16. The encoder as set forth in claim 15, wherein the number of the chip bits in the time domain PN sequence is greater by one than that of the user terminal included in one group.

17. The encoder as set forth in claim 14, wherein the plurality of user terminals connected to the base station form a plurality of groups therein, each of which includes more than one user terminal, in which the user terminal has an encoder, in which a wavelength domain encoding means performs an encoding operation using the same wavelength domain PN sequence.

18. The encoder as set forth in claim 17, wherein the number of the chip bits in the wavelength domain PN sequence is greater by one than that of the group.

19. The encoder as set forth in claim 15 or 17, wherein the base station maintains synchronization between codes received from more than one subscriber included in the same group.

20. The encoder as set forth in claim 12, wherein the two-dimensional code includes a row composed of the time domain PN sequence and a column composed of the wavelength domain PN sequence according to the time domain PN sequence, or which includes a column composed of the time domain PN sequence and a row composed of the wavelength domain PN sequence according to the time domain PN sequence.

21. A decoder decoding two-dimensional codes of optical signals, which are sequentially encoded in time domain and in wavelength domain and then transmitted by the base station, comprising:

wavelength decoding means for receiving the two dimensional codes, and decoding the two-dimensional codes in the wavelength domain to electric signals to be outputted;

time domain decoding means for decoding the electric signals in the time domain; and threshold determination means for determining whether the decoded signal in the time domain decoding means is a threshold, and outputting data bits based on the determination, wherein the two-dimensional code is a matrix type code generated from two different PN sequences including a time domain PN sequence in a first dimension and a wavelength domain PN sequence in a second dimension.

22. The decoder as set forth in claim 21, wherein the wavelength domain decoding means includes:

an optical circulator for inputting an optical signal encoded by the encoder through a first lead to output it to a second lead, and outputting a signal inputted by the second lead to a third lead;

an FBG array arranged on an optical line connected to the second lead of the optical circulator; and first and second optical detectors connected to one another in series, wherein a optical signal outputted from the second lead of the optical circulator and reflected from the FBG array is decoded into a decoding code, the length of which is the same as that of the wavelength domain PN sequence, and the decoding code is outputted through the third lead to input it to the first optical detector, a optical signal outputted from the second lead and passed through the FBG array is decoded to the complementary code which is complementary to the decoding code to input it to the second optical detector, and the first and second optical detectors convert the decoded optical signals into electrical signals in wavelength difference detection, and then output the electric signals thereto.

23. The decoder as set forth in claim 21, wherein the time domain decoding means includes an electrical multiplying element for multiplying an electric signal outputted from the wave domain decoding means by the time domain code or the complementary code of the time domain code.

24. A method of encoding/decoding data bits in an OCDMA system including a plurality of user terminals connected to a base station, comprising the steps of:

generating a time domain code having a sequence according to the data bits or a complementary code which is complementary to the time domain code, and encoding the data bits in time domain, based on the generation;

transmitting two dimensional code or a complementary code of the two dimensional code, in which the two dimensional code is generated as light inputted from the outside is encoded into a wavelength domain sequence and the complementary code is generated as the inputted light is encoded into a complementary sequence of the wavelength domain sequence, according to chip bits of the time domain code or the complementary code which is complementary to the time domain code;

receiving the encoded light signal from a network and decoding it in the wavelength domain to an electric signal to be outputted;

decoding the electric signal in the time domain; and determining whether the decoded signal decoded in the time domain is a threshold and outputting data bits thereto, wherein the two-dimensional code is a matrix type code generated from two different PN sequences including a time domain PN sequence in a first dimension and a wavelength domain PN sequence in a second dimension.

25. The method as set forth in claim 24, wherein the encoding the data bits in time domain serves to output the time domain PN sequence having a pattern according to the inputted data bit and a complementary sequence of the time domain PN sequence thereto.

26. The method as set forth in claim 24, wherein the outputting the electric signal serves to convert decoded light signal into the electrical signal in the wavelength domain in difference of detection waves and then outputs it thereto.

27. The method as set forth in claim 24, wherein the decoding the electrical signal in the time domain serves to multiply the electrical signal by the time domain code or a complementary code of the time domain code.

28. The method as set forth in claim 24, wherein the plurality of user terminals form a plurality of groups therein, each of which includes more than one user terminal, and wherein the encoding data bit in time domain is performed such that the user terminal included in the plurality of groups is encoded as time domain PN sequences, which are different from one another, in time domain.

29. The method as set forth in claim 28, wherein the number of the chip bits in the time domain PN sequence is greater by one than that of the user terminal included in one group.

30. The method as set forth in claim 24, wherein the plurality of user terminals connected to the base station form a plurality of groups therein, each of which includes more than one user terminal, and wherein the transmitting allows the user terminal included in the plurality of groups to encode as two dimensional code using the same wavelength domain PN sequence, and to transmit it to the network.

31. The method as set forth in claim 30, wherein the number of the chip bits in the wavelength domain PN sequence is greater by one than that of the group.

32. The method as set forth in claim 28 or 30, wherein the base station maintains synchronization between codes received from more than one subscriber included in the same group and between the codes transmitted from the more than one subscriber included in the same group.

33. The method as set forth in claim 24, wherein the two-dimensional code includes a row composed of the time domain PN sequence and a column composed of the wavelength domain PN sequence according to the time domain PN sequence, or which includes a column composed of the time domain PN sequence and a row composed of the wavelength domain PN sequence according to the time domain PN sequence.

* * * * *